June 8, 1965     R. A. HARRIS     3,187,940
APPARATUS FOR LOADING AND UNLOADING CONVEYOR BELTS
Filed May 4, 1964     4 Sheets-Sheet 1
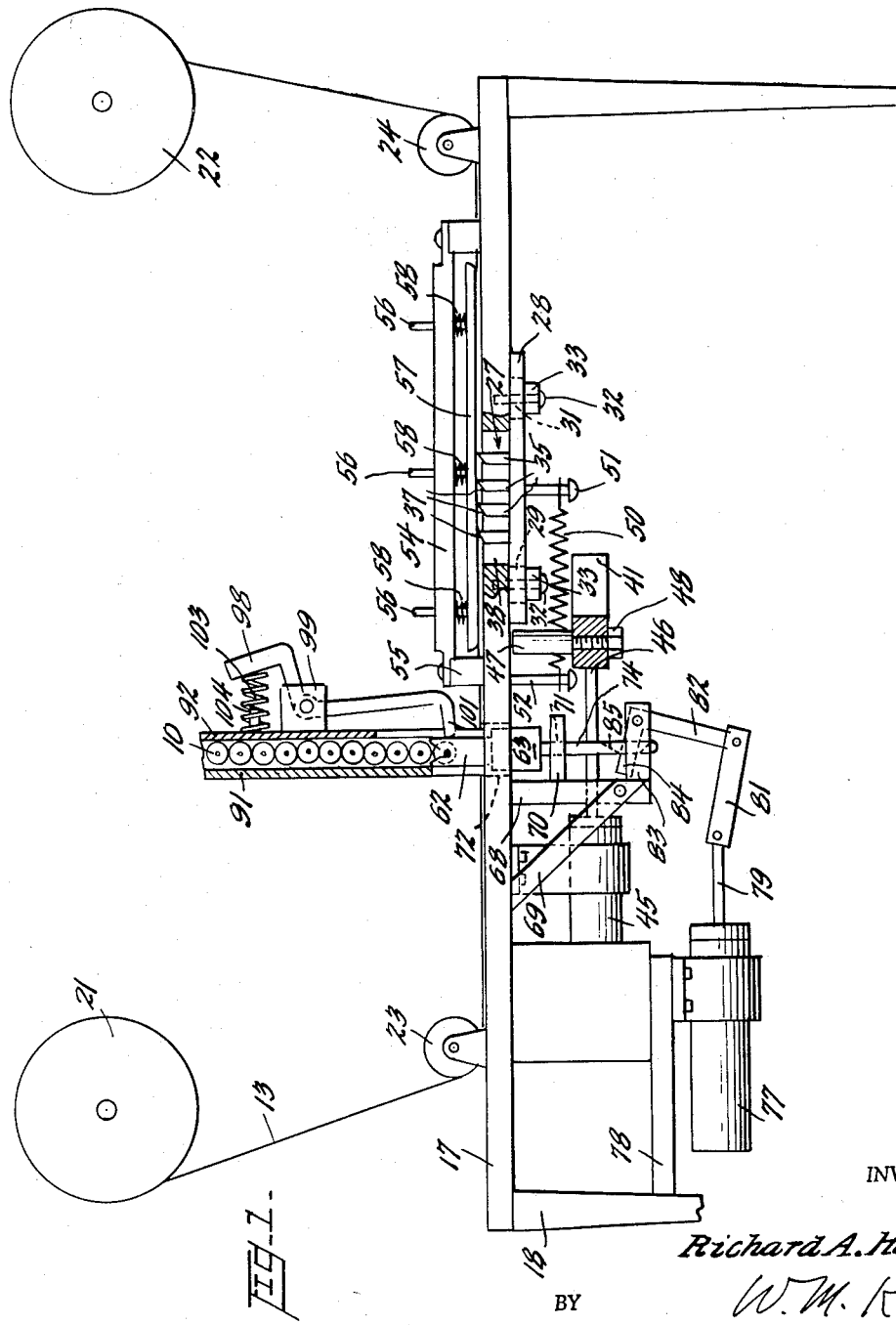
INVENTOR
Richard A. Harris,
BY W. M. Kain
ATTORNEY June 8, 1965 R. A. HARRIS 3,187,940
APPARATUS FOR LOADING AND UNLOADING CONVEYOR BELTS
Filed May 4, 1964 4 Sheets-Sheet 2
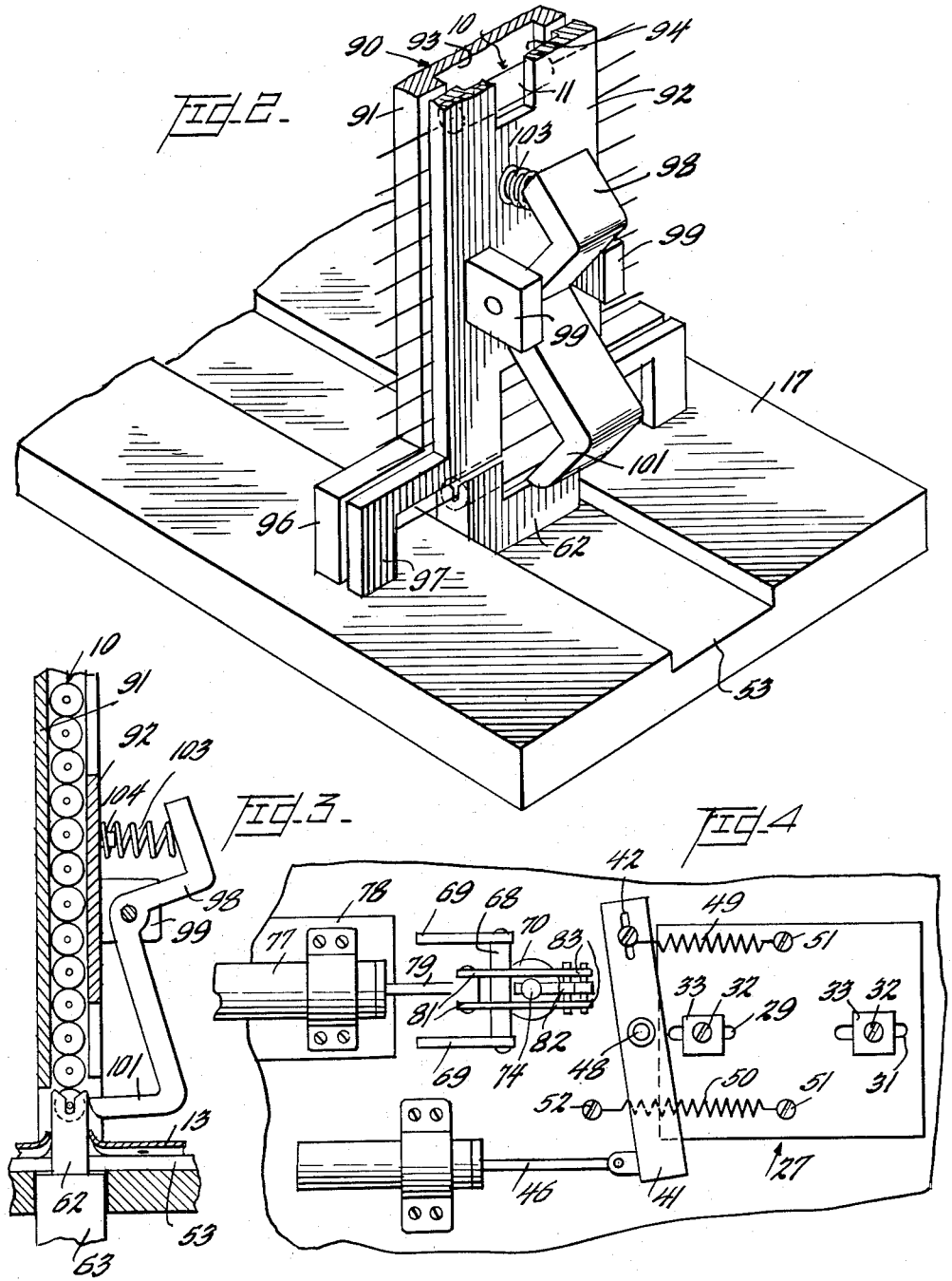

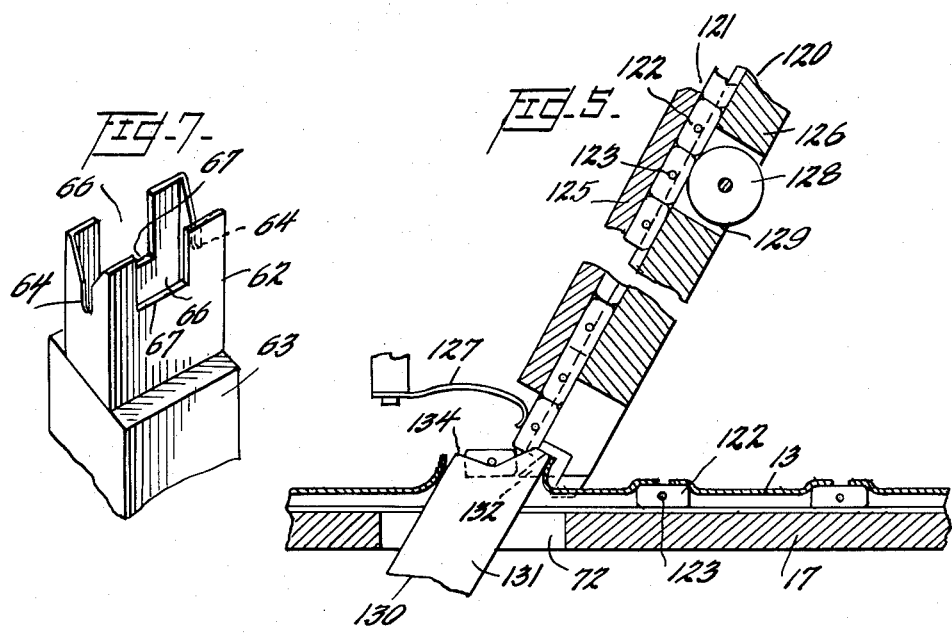
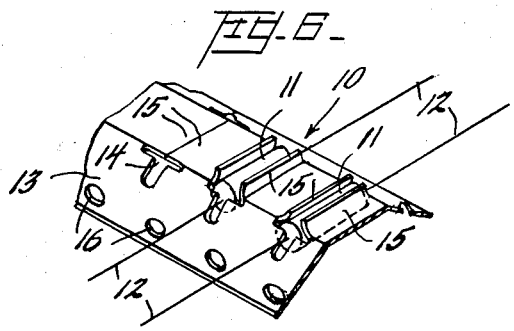
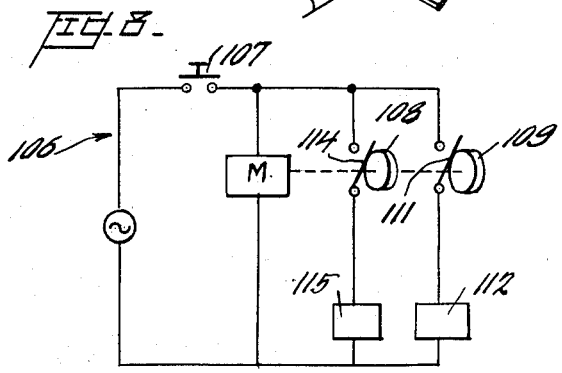

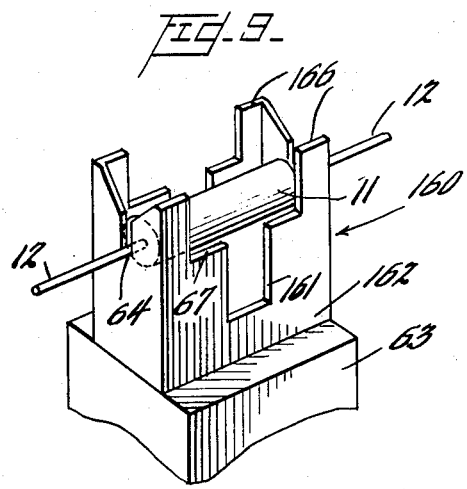
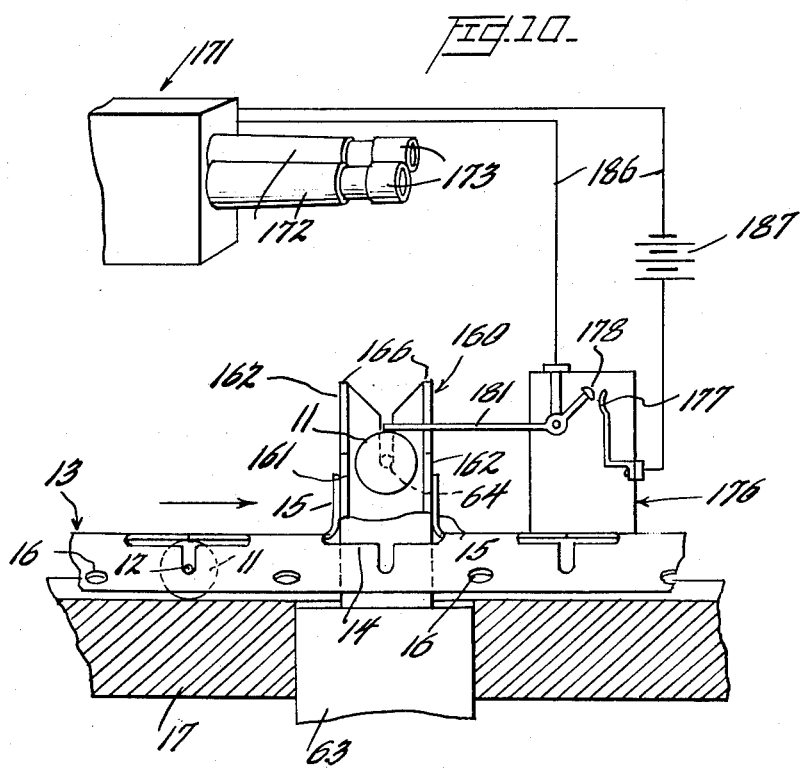

United States Patent Office 3,187,940
Patented June 8, 1965

3,187,940
APPARATUS FOR LOADING AND UNLOADING CONVEYOR BELTS
Richard A. Harris, High Point, N.C., assignor to Western Electric Company, Incorporated, New York, N.Y., a corporation of New York
Filed May 4, 1964, Ser. No. 364,841
10 Claims. (Cl. 221—74)

This application is a continuation-in-part of applicant's copending application Serial No. 309,574, entitled "Dispensing Device," filed September 17, 1963, now abandoned.

The present invention relates to apparatus for loading and unloading conveyor belts, and more particularly to such apparatus for loading and unloading conveyor belts of the sort forming the subject matter of applicant's copending application Serial No. 166,468, entitled "Belt Conveyor for Transporting Electric Components."

Today, industry is utilizing many types of automatic fabricating machines, for example, automatic component insertion and wire wrapping machines. In operation, these machines usually require various types of articles, such as electrical components having leads extending from either end, to be delivered in a predetermined orientation and in spaced relationship. Applicant has invented a flexible, one-piece conveyor belt having tabs formed integrally therewith for transporting these components in spaced relationship, which forms the subject matter of copending application, Serial No. 166,468, mentioned above.

Automatic fabricating machines which utilize belt conveyors such as applicant's, require the articles carried by the belts to be delivered at high rates of speed. Experience has shown that in order to render these belts economically feasible, it must be possible to load and unload these conveyor belts at corresponding high rates of speed. Commercially available dispensing, loading, and unloading devices have not proved satisfactory for this purpose.

In order to efficiently load these belts, it is necessary that apparatus be provided which is simple, inexpensive, yet capable of flexing open tabs of a conveyor belt and positioning articles beneath the tabs at high rates of speed. In order to efficiently unload these belts, it is necessary that such apparatus be capable of engaging the articles, flexing open the tabs of the conveyor belt, and presenting the articles in suitable orientation for reception by article utilizing machines and facilities. Improved unloading efficiency may be realized by providing such apparatus with facilities for providing a control signal indicating the unloading and presence for utilization of an article.

It is an object of the present invention to provide a new and improved conveyor belt loading and unloading apparatus.

It is another object of the present invention to provide apparatus for sequentially inserting electrical components into a conveyor belt having tabs which may be flexed away from the surface of the belt to receive and overlie the body portions of the components, which apparatus has facilities for maintaining the tabs flexed open until a component is placed thereunder.

It is still another object of this invention to provide apparatus for unloading electrical components from such conveyor belts, which apparatus is capable of engaging the components, flexing open the tabs, and presenting the articles in suitable orientation for utilizing machines and facilities. A related object is to provide such conveyor belt unloading apparatus having facilities for producing a control signal indicating the unloading and presence for utilization of a component.

With these and other objects in view, this invention contemplates an apparatus for loading and unloading articles, such as electrical components, into and from a conveyor belt, particularly a conveyor belt having component receiving apertures therein and tabs extending into the apertures for overlying and retaining components on the belt. Facilities are provided for reciprocating the breech through the apertures in the apertures in the belt to flex open and hold open the tabs, engage an article, and deposit the article beneath the tabs. The last-mentioned facilities are essentially reversible in operation to engage an article on the belt, flex open the tabs and present the article to utilizing machines and apparatus. To assist in performing the belt loading function, this apparatus may be provided with a magazine for receiving a supply of articles to be loaded. To assist in performing the belt unloading function, this apparatus may be provided with control signal producing facilities for indicating the unloading and presence of articles in the breech for reception by utilizing facilities.

Other objects and advantages of the present invention will be apparent from the following detailed description when considered in conjunction with the accompanying drawings, wherein:

FIG. 1 is a side elevational view, partially in section, showing a mechanism for advancing a belt conveyor and a breech constructed in accordance with the principles of the present invention for loading and unloading the belt conveyor;

FIG. 2 is a perspective view of the breech of FIG. 1 in engagement with a pawl for releasing a component from a magazine;

FIG. 3 is a partially sectional view of the breech of FIG. 1 holding a pair of tabs flexed open and engaging the pawl to release a component from the magazine into the breech;

FIG. 4 is a bottom view of the apparatus shown in FIGS. 1–3 particularly illustrating mechanisms for advacing the belt conveyor and reciprocating the breech;

FIG. 5 depicts another embodiment of a magazine and breech particularly suited for handling components having flat body portions;

FIG. 6 is a perspective view of components held by a belt conveyor having opposed pairs of tabs;

FIG. 7 is an enlarged perspective view of the breech shown in FIGS. 1 and 3.;

FIG. 8 is a circuit diagram showing an electro-mechanical control circuit for operating the mechanisms shown in the other figures;

FIG. 9 is a perspective view of a breech similar to that shown in FIGS. 1 and 3 modified for use in unloading a convey belt; and FIG. 10 is a partially sectional view of the breech of FIG. 9 employed in unloading a conveyor belt to present an article to utilizing facilities.

In FIG. 6, there are shown articles or electrical components 10 having cylindrical body portions 11 with leads 12 extending from opposite sides. The components 10 are inserted into a one-piece flexible conveyor belt 13 (subject of copending application, Serial No. 166,468) having spaced apertures 14 and opposed pairs of tabs 15 formd integrally therewith extending into the apertures. Equally spaced holes 16 are provided in the belt 13 which may be engaged by an escapement mechanism for advancing the belt. The tabs 15 are flexed away from the surface of the belt 13 to receive the body portions 11 of components 10. When the body portions 11 of the components 10 are positioned within the belt 13, the leads 12 rest against the surface of the belt, and the tabs 15 bear down upon the body portions 11 of the components to firmly hold the components within the belt.

Referring to FIG. 1, a platform 17 is supported on legs

18. A supply reel 21, loaded with a conveyor belt 13, and a takeup reel 22 are supported above the platform 17 by appropriate fixtures (not shown). The bolt 13 is dispensed from the supply reel 21 and passes under idler rollers 23 and 24 to the takeup reel 22.

The belt 13 is advanced along the platform 17 from the supply reel 21 to the takeup reel 22 by an escapement mechanism generally designated 27. The escapement mechanism 27 includes a rectangular slide plate 28 (also shown in FIG. 4) having elongated slots 29 and 31. A pair of bolts 32 extend through washers 33, through slots 29 and 31 and are screwed into the platform 17 a sufficient distance to hold the slide plate 28 in sliding engagement with the underside of the platform. Several teeth 35 (shown only in FIG. 1), having bevelled upper surfaces 37, are mounted on the upper side of the slide plate 28 and extend through an elongated slot 38 formed in the platform 17.

The slide plate 28 may be reciprocated by a pivotally mounted arm 41 shown in FIGS. 1 and 4. The arm 41 is provided with a slot 42 near one end. A pivot bolt 43 extends through the slot 42 to support and space the arm 41 from the underside of the platform 17. The arm 41 is spaced below the bolts 32 to allow the arm to freely pivot beneath the plate 28. A pneumatic cylinder 45 is secured to the underside of the platform 17 and has a piston rod 46 pivotally connected to the other end of the arm 41. As viewed in FIG. 1, a lug 47 is secured on the top of the arm 41 by a screw 48 which extends upward through the pivot arm. The lug 47 terminates a slight distance below the underside of the platform 17. Springs 49 and 50 are connected between screws 51 secured to the slide plate 28 and a screw 52 secured to the platform 17 and bolt 43, respectively, thereby urging the plate 28 to the left, as viewed in FIG. 4.

As best seen in FIG. 2, platform 17 has a slotted guideway 53 for receiving and guiding component bodies 11 held in the belt 13. A support bar 54 (only shown in FIG. 1) is mounted on arched brackets 55 which span the guideway 53 to permit the belt 13 to freely advance along the platform 17 beneath the brackets. Three rods 56 slidably extend through apertures in the support bar 54. A pressure foot 57 is attached to the lower ends of the rods 56. Springs 58 are positioned about the rod 56 and urge the pressure foot 57 into engagement with the belt 13 to hold the components 10 in the guideway 53 and the belt in engagement with the teeth 35.

When pressurized air is supplied to the pneumatic cylinder 45, the piston rod 46 is advanced toward the right as viewed in FIGS. 1 and 4 and the lug 47 engages the slide plate 28 to advance the teeth 35 and thus the belt 13 to the right. At the completion of a predetermined stroke of the piston rod 46, the air supply is cut off and springs 49 and 50 return the slide plate 28 to its original position. During the return of the slide plate 28, the bevelled portions 37 of the teeth 35 ride on the underside of the belt 13 without drawing the belt to the left.

Referring to FIG. 7, a breech 62, formed out of a rectangular piece of stock, is mounted at one end on a support 63. The other end of the breech 62 has an oppositely disposed pair of substantially U-shaped cutouts 64 defining cradling surfaces for supporting a component 10 by its leads 12. A pair of oppositely disposed cutouts 66, terminating in cam surfaces 67, are formed in the end of the breech 62 at substantially right angles to the cutouts 64.

Referring now to FIGS. 1 and 4, a bracket 68 braced by a pair of struts 69 depends from the underside of the platform 17. A guide plate 70 is attached to the bracket 68 and has a vertical guide hole 71 extending therethrough. The breech 62 is positioned within a slot 72 in the platform 17 and is supported for vertical reciprocation therethrough by a shaft 74 which slidably extends through the guide hole 71.

A double acting pneumatic cylinder 77 provided with a piston rod 79 is supported from the lower end of a support plate 78.

Piston rod 79 transmits motion to the breech 62 through spaced links 81 and L-shaped link 82 pivotally mounted on arms 83 extending from bracket 68. The free end 84 of the link 82 is slidably received in a generally conical bore 85 in the shaft 74. Upon the advancement of the piston rod 79 to the left, as viewed in FIG. 1, the breech 62 is reciprocated upwardly and upon advancement of the piston rod to the right, the breech is advanced downwardly.

In FIG. 1, and particularly FIGS. 2 and 3, there is shown a magazine 90 for holding a supply of components 10 stacked one on top of the other. Magazine 90 consists of spaced channel members 91 and 92 with channels 93 and 94 facing one another. The channels 93 and 94 form a compartment for receiving and guiding the body portions 11 of the components 10. The leads 12 of the components 10 extend outwardly between the channel members 91 and 92. The channel members 91 and 92 are supported above the guide slot 53 by arch-type brackets 96 and 97, which permit the belt 13 to advance beneath the magazine 90. Brackets 96 and 97 are removably fixed to platform 17.

A pawl 98 provided with a foot portion 101 is pivotally supported by brackets 99 on the outside of channel member 92. A spring 103 is positioned over a peg 104 (shown in FIGS. 1 and 3) extending from the channel member 92 and bears against the pawl 98 to normally urge the foot portion 101 beneath the terminus of the magazine to hold the components 10 therein.

The control circuit shown in FIG. 8 and generally designated 106 will be described in connection with the operation of this machine in loading a belt 13. Belt 13 is drawn off of the supply reel 21 and threaded beneath idler roller 23, magazine 90, pressure foot 57, and idler roller 24, and onto the take-up reel 22, as shown in FIG. 1. The teeth 35, of the escapement mechanism 27, are engaged in the holes 16 in the belt 13. Magazine 90 is then loaded with a supply of components 10. Switch 107 is depressed to energize motor M for rotating cams 108 and 109 at a predetermined rate of speed to load belt 13. The motor M may be of the variable speed type to allow for loading belt 13 at any desired speed. Cam 109 initially closes associated switch 111 to actuate solenoid valve 112. The actuation of solenoid valve 112 supplies pressurized air to the pneumatic cylinder 45 to advance the slide plate 28 and hence the belt 13. At the end of each advancement of the slide plate 28, an aperture 14 and a pair of opposed tabs 15 in the belt 13 are positioned directly over the breech 62 and beneath the magazine 90. As switch 111 opens, pneumatic pressure is removed from the cylinder 45 to allow springs 49 and 50 to return slide plate 28 to its initial position.

At this time cam 108 closes associated switch 114 to actuate solenoid valve 115. The actuation of solenoid valve 115 applies pressurized air to the double-acting pneumatic cylinder 77 to advance the breech 62 upwardly through the tabs 15 in the belt 13 as shown in FIG. 3. As shown in FIGS. 2 and 3, the breech 62 contacts the foot portion 101 of the pawl 98 with one of the cam surfaces 67 to pivot the foot portion 101 from beneath the stack of components 10. The components 10 are then held in the breech by the leads 12 resting in the U-shaped cutouts 64. At the same time, the breech 62 maintains tabs 15, as shown in FIG. 3, flexed away from the surface of the belt 13.

When switch 114 opens, pressurized air is applied to the double-acting pneumatic cylinder 77 to withdraw the breech from beneath the magazine 90 through the belt 13. Upon withdrawal of the breech, the lowermost component 10 is removed from the magazine 90 and spring 103 urges the foot portion 101 of the pawl 98 beneath the next component to again support the stack. As the breech 62 passes through the belt 13, the leads 12 come to rest on the belt and the body portion 11 is positioned beneath the tabs and the tabs are permitted to close upon the body portion. The cycle of operation now continues, and the components are successively loaded into the belt 13.

In FIG. 5 there is shown an alternative magazine 120 especially suited to handle rectangular components 121 having flat body portions 122 and leads 123 extending from opposite side thereof. This magazine includes a pair of opposed channel members 125 and 126 removably supported by arch-type supports (not shown) above the platform 17. A leaf springs 127 engages the lowermost components 121 and urges the component against channel member 126 to hold the stack of components within the magazine 120. A wheel 128 is provided in a cutout portion 129 of channel member 126 and engages a component 121. As the wheel 128 is rotated counterclockwise, component 121 is positively advanced downwardly to move the lowermost component past the spring 123.

When loading components 121, having flat body portions 122, efficient utilization of the belt 13 requires that the wider dimension of the components lie parallel to the belt. A breech 130 made of hollow rectangular stock 131, is provided to accomplish this. A cam surface 132, substantially a 45° wedge-shaped surface, is attached to the right-hand end of the breech 130, to cam the body portions 122 of the components 121 parallel to the belt 13. The components are supported within the breech 130 by their leads 123 resting on the lowermost portions of inclined surfaces 134.

Operation of magazine 120 and breech 130 in loading a belt 13 is substantially the same as operation of magazine 90 and breech 62. Breech 130 is advanced upward through the belt 13, opening a pair of tabs 15 and wheel 128 is rotated to advance the lowermost component 121 from the magazine 120 in to the breech 130. As the breech 130 is withdrawn from the belt 13, the leads 123 of the component 121 come to rest on the belt 13, and the tabs 15 close over the body portion 122.

The above-described embodiments of this invention, and the cycles of operation thereof have been set forth in the context of loading a belt 13 with components from suitable magazines. As indicated earlier, however, the functioning of this apparatus is assentially reversible to unload a belt 13 and present articles to any of a variety of utilizing facilities.

This cycle of operation will be discussed with reference to FIGS. 9 and 10 which illustrate a modified breech 160 which is mounted on support 63 in place of breech 62 or breech 130, as the case may be.

Breech 160 is identical to breech 62 with the exception of the addition of a slot 161 communicates with cam surfaces 67 at its upper end and extends below the position occupied by an article, for example component 11 when supported by its leads 12 in the cradling surfaces of cutouts 64.

Prior to initiating a belt unloading cycle of operation, magazine 90 or magazine 120, as the case may be, is removed and a belt 13 loaded with components is placed on supply reel 21 (FIG. 1). These components may be similar to components 10 (FIG. 6) having cylindrical bodies, similar to components 121 (FIG. 5) having rectangular bodies, or they may have other body shapes. The loaded belt 13 is threaded under idler rollers 23 and 24 (FIG. 1) and received upon take-up reel 22.

The unloading cycle of operation is initiated by energizing motor M (FIG. 8). The facilities for reciprocating breech 62 (or breech 130) upward through platform 17 and through apertures 14 in conveyor belt 13, as well as the facilities described with reference to FIGS. 1 and 4 for indexing belt 13 to present aperatures 14 sequentially over the reciprocating breech, operate as discussed above.

Referring to FIG. 10, belt 13 is indexed to present an aperture 14 in the path of reciprocation of breech 160. A pair of upper end surfaces 166 of the breech first contact tabs 15 forcing them to open. The cradling surfaces of cutouts 64 engage and support a component 11 by its leads 12. Side surfaces 162, which are spaced from component 11, hold tabs 15 open and also prevent any portion of the belt from interfering with the component as it is moved upward in a predetermined orientation suitable for reception by utilizing machines or facilities. Such facilities are illustrated, for example, by automatic wire wrapping machine 171 having a pair of wire wrap bits 172 including reciprocable spindles 173. Further upward movement of breech 160 carries the component supported by its leads in the cradling surfaces of cutouts 64 in a desired uniform orientation suitable for reception by such utilizing facilities.

After the utilizing facilities, in this case automatic wire wrapping machine 171, have received component 11, as by projecting spindles 173 under leads 12 after the component has been elevated to a point above the spindles, the breech is withdrawn. Since side surfaces 162 present a smooth, continuous, surface to tabs 15, the tabs are prevented from interfering with the withdrawal of breech 160. Also, injury to the tabs, as well as unnecessary flexing of the tabs is prevented.

This cycle of operation in unloading a belt is repeated to meet the requirements of the utilizing facilities.

It is usually very desirable to prevent the operation of utilizing facilities in the event breech 160 fails to present a component to the utilizing facilities. This possibility is effectively prevented by sensing the presence or absence of a component in the breech 160 after the breech has moved upward to clear the belt 13. This sensing function is performed by a control signal producing switch 176 having a fixed contact 177 and a movable contact 178. The movable contact is mounted on a switch arm 181 which is pivotally mounted within the switch and lightly spring biased in the counterclockwise direction to assure its return to its normal position. Switch arm 181 is mounted in alignment with slot 161 so that in no case may the empty breech pivot switch arm 181 to close the contacts. Also, switch arm 181 overlies the position of an article which is supported in the breech.

When the breech 161 is elevated and carries no component 11, switch arm 181 is not moved from its normal position, and the contacts are not closed. On the other hand, when a component 11 is supported in the breech, the switch arm intercepts the component and closes the contacts regardless of the diameter of the component body or its cross sectional configuration.

Switch 176 may be connected as by means of leads 186 to the utilizing facilities. As shown in FIG. 10, a signal derived from battery 187 is sent to wire wrapping machine 171 to initiate or otherwise control its cycle of operation when, and only when, the contacts are closed indicating the presence of a component 11 in breech 160.

It is to be understood that the above-described arrangements are simply illustrative of an application of the principles of this invention. Numerous other arrangements may be devised by those skilled in the art which will embody the principles of the invention and fall within the spirit and scope thereof.

What is claimed is:
1. In an apparatus for loading components having leads extending from opposite sides into a conveyor belt having spaced apertures and tabs extending into the aperatures which may be flexed away from the surface of the belt to receive components,
    a magazine positioned on one side of the belt for receiving a supply of components having leads extending from opposite sides,
    means positioned on the opposite side of said belt mounted for reciprocation through the apertures for flexing open and holding the tabs flexed open, means mounted on the reciprocable means for releasing and picking up a component from the magazine, and means for reciprocating the reciprocable means to pick up a component and position the component beneath the tabs in an aperture with the leads lying on the belt.

2. In an apparatus for loading a component having a body portion and leads extending from opposite sides into an aperture in a surface wherein a pair of tabs which may be flexed away from the surface extend into the aperture from opposite sides thereof, a magazine having a terminus at one end for receiving a component, foot means positioned beneath the component for holding the component in the magazine, a breech having at least one dimension long enough to contact the pair of tabs simultaneously upon reciprocation through the aperture for flexing the tabs away and maintaining the tabs flexed away from the surface and for receiving the component, cam means formed on the breech for camming the foot means away from beneath the component to release the component into the breech, and means for reciprocating the breech through the aperture to pick up a component and for withdrawing the breech from the aperture to deposit the component body beneath the tabs with the leads lying on the surface.

3. In a device for loading an article into an aperture in a surface wherein a pair of tabs which may be flexed away from the surface extend into the aperture from opposite sides thereof, means for holding an article, pick up means advanceable through the aperture for opening and holding open the tabs and picking up an article, said means including surfaces of sufficient dimension to contact and flex away the pair of tabs from the surface upon advancement through the aperture, and means for advancing the pick up means through the aperture to pick up the article and for withdrawing the pick up means from the aperture to deposit the article on the surface beneath the tabs.

4. In a device for loading an article into an aperture in a surface wherein a pair of tabs which may be flexed away from the surface extend into the aperture from opposite sides thereof in accordance with claim 3, wherein the means for holding an article comprises a magazine for receiving an article, resilient means engaging the article for holding the article in the magazine, and means for advancing the article past the resilient means into the pick up means.

5. In a device for loading an article into an aperture in a surface wherein a pair of tabs which may be flexed away from the surface extend into the aperture from opposite sides thereof in accordance with claim 4, wherein the article is of rectangular shape, and the pick up means further includes an inclined cam surface for positioning the rectangular article with the wide dimension parallel to the surface.

6. In a device for loading a component having a pair of laterally extending leads into a belt having an aperture with a pair of oppositely projecting flexible tabs covering the aperture, a vertical magazine for receiving said component, movably mounted means for holding the component in the magazine with the projecting leads extending in a horizontal plane, a breech movably mounted in alignment with said magazine, said breech comprising a hollow member of a size sufficient to receive the component and having a wall positioned in alignment with said holding means, said member having a pair of cutouts formed in opposite walls to receive said leads, means for advancing said belt to move said tabs into alignment with the magazine and said breech, and means for moving said breech through said belt to flex said tabs and move said holding means from said component to allow said component to drop into said hollow member with the leads resting in said cutouts, and then for moving said breech back through the aperture to deposit said leads on the upper surface of said belt and allow said flexible tabs to move about said component.

7. In an apparatus for individually inserting electrical components having body portions and leads extending from opposite sides into an intermittently advancing conveyor belt having spaced apertures and pairs of tabs which may be flexed away from the surface of the belt extending into the apertures from opposite sides thereof, a magazine positioned above the conveyor belt for receiving a supply of components stacked one upon the other, a foot pivotally mounted on the magazine, resilient means for pivoting the foot beneath the lowermost component to support the stack of components, a breech positioned beneath the conveyor and mounted for advancement toward and withdrawal from the magazine comprising a rectangular channel member for receiving the body portions of the components and having notches on opposite sides for supporting the components by the leads, said rectangular channel being of sufficient size to engage and flex a pair of tabs away from the belt upon advancement through an aperture in the conveyor belt, means for intermittently advancing the conveyor belt to position the apertures sequentially in the path of advancement of the breech, and means rendered effective upon the positioning of an aperture in the path of advancement of the breech for advancing the breech through the aperture to flex open the tabs, cam the foot from beneath the lowermost component to release the lowermost component into the breech, and for withdrawing the breech from within the aperture to position the component body within the aperture and place the leads on the belt permitting the tabs to overlie and urge the component body downward.

8. In apparatus for loading and unloading components having leads extending from their opposite sides from a conveyor belt having apertures for receiving the component bodies and flexible tabs extending into the apertures for retaining the components on the belt, a breech comprising a hollow member of a size sufficient to receive a component body, said member having spaced upper end surfaces for engaging the tabs, and cradling surfaces for supporting the component by its leads below and between the upper end surfaces, means for advancing the belt to move the apertures into alignment with the breech, and means for reciprocating the breech through the apertures to engage the leads and flex and hold open the tabs.

9. In apparatus for loading and unloading components having leads extending from their opposite sides from a conveyor belt having apertures for receiving the component bodies and flexible tabs extending into the apertures for retaining the components on the belt, a breech comprising a hollow member of a size sufficient to receive a component body, said member having spaced upper end surfaces for engaging the tabs, side surfaces for holding the tabs open, and cradling surfaces for supporting the component by its leads below and between the upper end surfaces, means for advancing the belt to move the apertures into alignment with the breech, and means for reciprocating the breech through the apertures to engage the leads and flex and hold open the tabs.

10. In an apparatus for unloading components having leads extending from their opposite sides from a conveyor belt having apertures for receiving the component bodies and flexible tabs extending into the apertures for retaining the components on the belt,
- a breech comprising a hollow member of a size sufficient to receive a component body, said member having spaced upper end surfaces for engaging the tabs, side surfaces for holding the tabs open, and cradling surfaces for supporting the component by its leads below and between the upper end surfaces, at least one of said side surfaces being provided with a slot therethrough extending downward and below the cradling surfaces,
- control signal producing means including contacts which are controlled by an arm aligned with said slot and extending across the position taken by a component supported on the cradling surfaces,
- means for advancing the belt to move the apertures into alignment with the breech, and
- means for reciprocating the breech through the apertures to engage the leads, flex and hold open the tabs, and move the component against the arm to provide an indication of the presence of a component in the breech.

References Cited by the Examiner
UNITED STATES PATENTS

| | | | |
|---|---|---|---|
| 2,366,886 | 1/45 | Van Tuyl | 214—310 |
| 2,979,726 | 4/61 | Carlzen et al. | 221—74 |
| 3,056,436 | 10/62 | Fechheimer et al. | 141—59 |

RAPHAEL M. LUPO, *Primary Examiner.*